United States Patent [19]

Setsumasa et al.

[11] Patent Number: 5,794,874
[45] Date of Patent: Aug. 18, 1998

[54] TAPE GUIDING POLE ANGLE ADJUSTING MECHANISM

[75] Inventors: Keiichi Setsumasa; Ryoichi Annen, both of Atsugi, Japan

[73] Assignee: Mitsumi Electric Co., Ltd., Japan

[21] Appl. No.: 769,546

[22] Filed: Dec. 19, 1996

[30] Foreign Application Priority Data

Dec. 26, 1995 [JP] Japan ................ 7-339730

[51] Int. Cl.⁶ .................................................. G03B 23/02
[52] U.S. Cl. ........................... 242/346.1; 360/85
[58] Field of Search ................ 242/346.1; 226/191, 226/199; 360/85, 95, 74.3

[56] References Cited

U.S. PATENT DOCUMENTS

| 4,556,922 | 12/1985 | Erhart | 360/95 X |
| 4,672,479 | 6/1987 | Takao et al. | 360/95 |
| 4,837,646 | 6/1989 | Nagai et al. | 360/85 |
| 5,115,361 | 5/1992 | Terayama et al. | 360/85 |
| 5,220,469 | 6/1993 | Nagata | 360/85 |
| 5,285,332 | 2/1994 | Konishi et al. | 360/85 |
| 5,307,219 | 4/1994 | Haba | 360/85 |
| 5,369,536 | 11/1994 | Konishi et al. | 360/85 |
| 5,546,249 | 8/1996 | Konishi et al. | 360/85 X |

FOREIGN PATENT DOCUMENTS

59-127261  7/1984  Japan ................ 360/85

*Primary Examiner*—Donald P. Walsh
*Assistant Examiner*—William A. Rivera
*Attorney, Agent, or Firm*—Ladas & Parry

[57] ABSTRACT

A tape guiding pole angle adjusting mechanism for a magnetic tape recording/reproducing apparatus including a base portion, a tape guiding pole, a sub-arm on which the tape guiding pole is fixed, a sub-arm supporting mechanism, and an adjusting screw mechanism. The sub-arm supporting mechanism supports the sub-arm in a manner making an inclination angle of the tape guiding pole changeable, and the adjusting screw mechanism is capable of making a fine adjustment of an inclination angle of the tape guiding pole.

8 Claims, 7 Drawing Sheets

TAPE GUIDING POLE ANGLE ADJUSTING MECHANISM

BACKGROUND OF THE INVENTION

1. Field of the Invention

The present invention generally relates to a tape guiding pole angle adjusting mechanism and, more particularly, to a tape guiding pole angle adjusting mechanism which may be used in a magnetic tape recording-reproducing apparatus in which the magnetic tape is supplied from a feed reel and taken up by a takeup reel.

2. Description of the Related Art

There are many types of magnetic tape recording-reproducing apparatuses available in the market. For example, there is a magnetic tape recording-reproducing apparatus called a digital audio tape recorder (DAT). In DAT, a magnetic tape contained in a cassette is supplied from a feed reel, contacted to a rotary drum having a magnetic head and then taken up by a takeup reel. The magnetic tape runs through a predetermined tape path.

When the magnetic tape is contacted by the rotary drum, it is guided by a lead portion, provided on a surface of the rotary drum, and runs diagonally on the rotary drum. This is a necessary step for carrying out a recording and reproducing of information according to the DAT system. However, since the contact of an edge portion of the magnetic tape with the lead portion of the rotary drum cannot be avoided, the edge of the magnetic tape can be damaged in an accident or during long-term use and if it is damaged, the pathway of the magnetic tape on the surface of the rotary drum is more or less shifted from the initial pathway of the magnetic tape. Thus, there is a possibility that a recording or reproducing of information may become inaccurate.

On the other hand, there is a tendency for the length of a magnetic tape contained in a cassette to increase in order to increase recording capacity. Nowadays, the length of the tape can be up to 120 meters. In general, as the length of the tape is increased the thickness of the tape is decreased. For instance, the 120-meter tape has a thickness of a mere 7 μm. Thus, the mechanical strength of such a long magnetic tape is naturally weakened and can be easily damaged.

Therefore, it is necessary for the DAT to have a mechanism by which a tape is not damaged even during long-term use so that an increased recording/reproducing stability can be attained.

Figure 1:
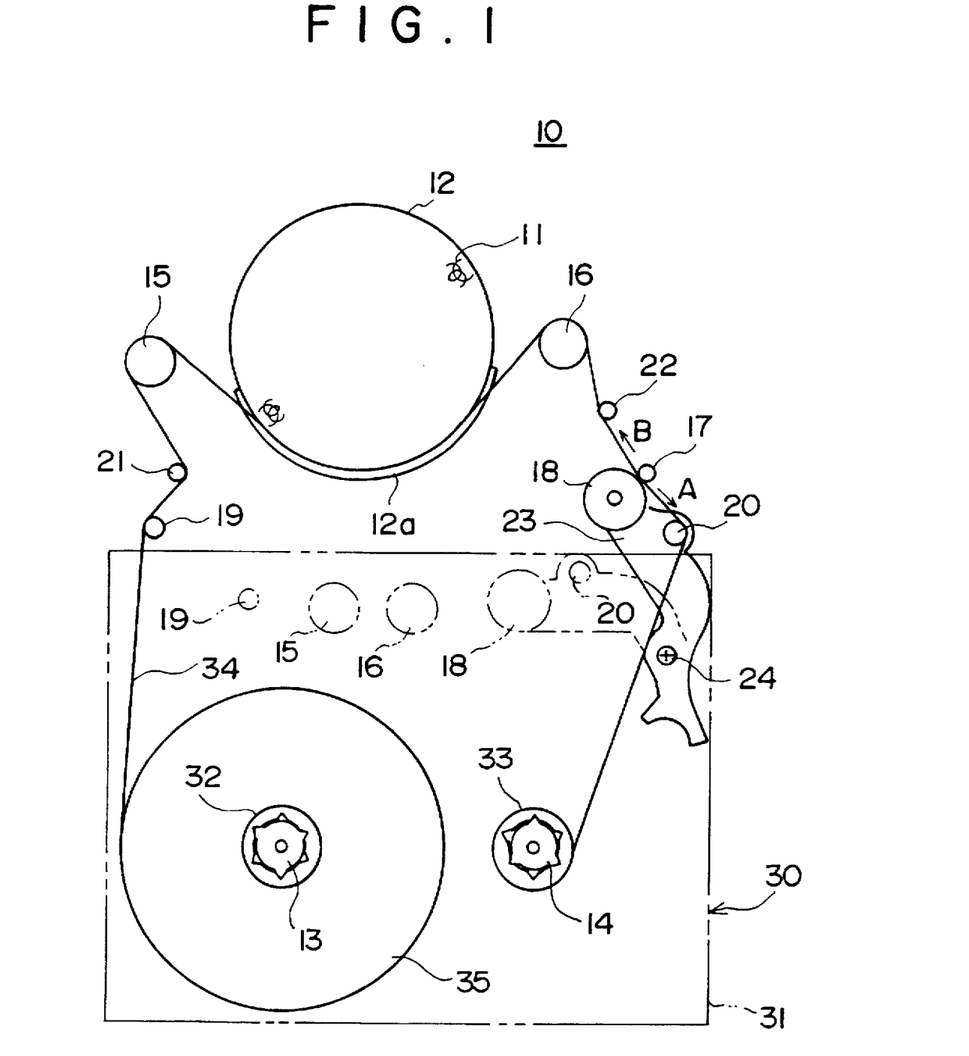
FIG. 1 is a structural diagram showing a conventional digital audio tape recorder.

FIG. 1 shows a conventional digital audio tape recorder 10. The DAT 10 comprises a rotary drum 12 having a magnetic head 11, a feed reel shaft 13, a takeup reel shaft 14, tape loading poles 15 and 16, a capstan 17, a pinch roller 18, a tape guiding pole 19 on the outlet side, a tape guiding pole 20 on the inlet side, a tension detection pole 21, a tape guiding pole 22, and a rotatable arm 23.

In use, a cassette 30 is loaded into the DAT 10. The cassette 30 includes, as shown in FIG. 1, a case 31, a feed reel 32, a takeup reel 33, and a magnetic tape 34. When loaded, the feed reel 32 is engaged with the feed reel shaft 13 and the takeup reel 33 is engaged with the takeup reel shaft 14. Then a tape loading operation is carried out, in which the tape loading poles 15 and 16, the pinch roller 18, the tape guiding pole 19 on the outlet side and the tape guiding pole 20 on the inlet side are moved so that the magnetic tape 34 is pulled from the case 31 and contacted to the rotary drum 12 with a contact angle of 90°. The magnetic tape 34 is moved by the capstan 17 and the pinch roller 18 at a constant speed in the direction indicated by the arrow A shown in FIG. 1 and is taken up by the takeup reel 33. The recording/reproducing of information is carried out while the tape 34 is in contact with the rotary drum 12. As mentioned above, when the magnetic tape 34 is in contact with the rotary drum 12, the lower edge of the tape 34 is guided by a lead portion 12a, provided on a surface of the rotary drum 12, and runs diagonally on the rotary drum 12.

The tape guiding pole 20 on the inlet side is located close to the capstan 17 so that it can guide the magnetic tape 34, which runs in a normal direction (i.e., the A direction indicated by the arrow shown in FIG. 1) immediately after the tape passes the capstan 17. Also, during a reverse search mode in which the magnetic tape 34 is run in a direction indicated by the arrow B shown in FIG. 1 at a faster speed than that during a recording/reproducing operation by the capstan 17 and the pinch roller 18, the tape guiding pole 20 on the inlet side guides the magnetic tape 34 just before the capstan 17. Thus, the tape guiding pole 20, among a plurality of tape guiding poles, has the most effect or influence on a running condition of the magnetic tape 34.

Figure 2A:
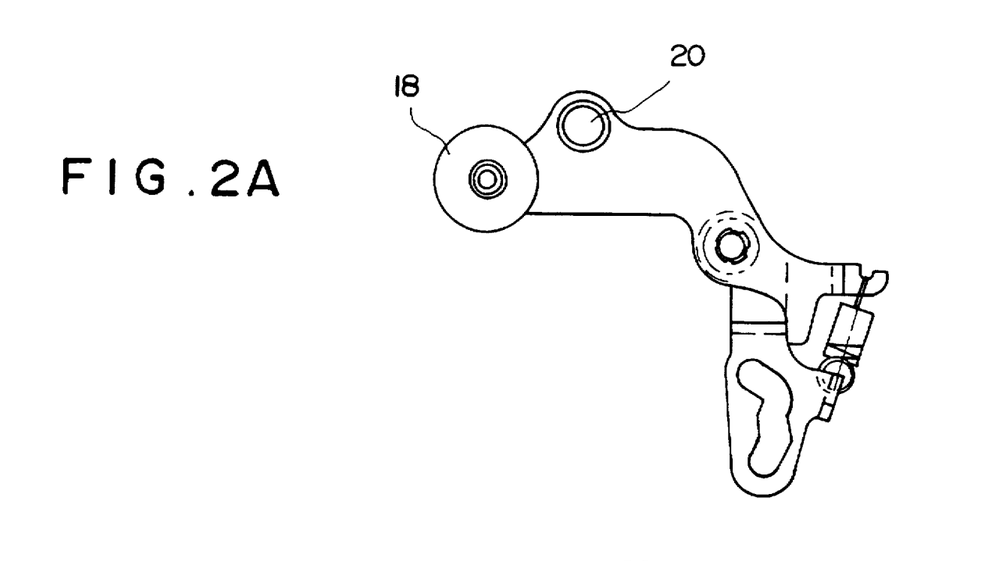
FIG. 2A is a top view of a conventional sub-arm portion showing the location of the tape guiding pole of an inlet side.
Figure 2B:
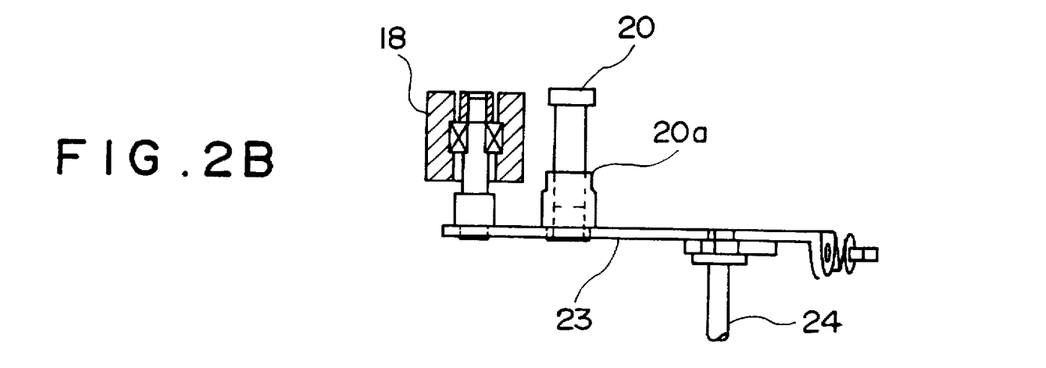
FIG. 2B is a side view of the conventional sub-arm portion showing the shape of the tape guiding pole on the inlet side.

FIGS. 2A and 2B are diagrams showing a sub-arm portion where the tape guiding pole 20 on the inlet side is located. FIG. 2A is a top view of the sub-arm portion showing the location of the tape guiding pole 20 on the inlet side and FIG. 2B is a side view of the sub-arm portion showing the shape of the tape guiding pole 20 on the inlet side.

As shown in the figures, the tape guiding pole 20 is caulked with the rotatable arm 23. For this reason, if the tape guiding pole 20 is inclined due to, for instance, an inaccurate caulking, the angle of the tape guiding pole 20 cannot be adjusted. If this kind of inclined tape guiding pole is used, the magnetic tape guided by the tape guiding pole is shifted in a lower or upper direction and an edge of the magnetic tape may be damaged upon contact with a flange 20 of the tape guiding pole 20, for instance.

SUMMARY OF THE INVENTION

Accordingly, it is a general object of this invention to provide a mechanism for adjusting an angle of a tape guiding pole in which the above-mentioned problems are eliminated.

Another object of this invention is to provide a recording-reproducing apparatus using the mechanism for adjusting an angle of a tape guiding pole in which the above-mentioned problems are eliminated.

A more specific object of the present invention is to provide a mechanism for adjusting an angle of a tape guiding pole and a magnetic tape recording-reproducing apparatus using the mechanism for adjusting an angle of a tape guiding pole by which edge portions of a magnetic tape are not damaged even when the tape is used repeatedly.

The objects described above are achieved by a tape guiding pole angle adjusting mechanism for a magnetic tape recording/reproducing apparatus comprising: a base portion, a tape guiding pole, a sub-arm on which the tape guiding pole is fixed, a sub-arm supporting mechanism, and an adjusting screw mechanism, wherein the sub-arm supporting mechanism supports the sub-arm in a manner which makes an inclination angle of the tape guiding pole changeable, and the adjusting screw mechanism is capable of making a fine adjustment of an inclination angle of the tape guiding pole.

According to the above tape guiding pole angle adjusting mechanism for a magnetic tape recording/reproducing apparatus, the adjustment of the inclination of a tape guiding pole may be performed on the base portion when tape loading is completed. Thus, it is possible to carry out the operation in a more stable condition.

The objects described above are achieved by the tape guiding pole angle adjusting mechanism for a magnetic tape recording/reproducing apparatus, wherein the sub-arm supporting mechanism is comprised of: a shaft fixed to the base portion, and a spring member, the shaft supports the sub-arm in a manner which makes an inclination angle of the guiding pole changeable and the spring member pushes the sub-arm supported by the shaft in one direction in order to decrease vibration of the sub-arm, generated when a magnetic tape contacts the tape guiding pole.

According to the above tape guiding pole angle adjusting mechanism for a magnetic tape recording/reproducing apparatus, since the sub-arm supported by the shaft is pushed by the spring member, there is no clearance for the sub-arm in a running direction of the tape. Thus, the sub-arm does not vibrate during contact with the tape and hence the running stability of the tape may be maintained compared with a case in which a conventional tape guiding pole is used.

The objects described above are achieved by the tape guiding pole angle adjusting mechanism for a magnetic tape recording/reproducing apparatus, wherein the adjusting screw mechanism is comprised of: a shaft member, a nut, and a spring member, one end of the shaft member is caulked with the base portion and a thread portion is formed on the other end of the shaft member, the shaft member penetrating a hole formed in the sub-arm and being tightened by the nut engaged with the thread portion of the shaft member, the spring member being located around the shaft member in a position between the base portion and the sub-arm and exerting a force in a direction to push up the sub-arm, and an inclination angle of the tape guiding pole is finely adjusted by tightening or loosening the nut located on the sub-arm.

According to the above tape guiding pole angle adjusting mechanism for a magnetic tape recording/reproducing apparatus, since a nut which may be easily adjusted by a tool such as a screw driver is used for adjusting an inclination of the tape guiding pole and the nut is not hidden by, for instance, a pinch roller, the adjustment operation may be very readily carried out.

The objects described above are achieved by a magnetic tape recording/reproducing apparatus comprising: a feed reel shaft, a takeup reel shaft, a magnetic head, and a tape guiding pole angle adjusting mechanism, the tape guiding pole angle adjusting mechanism including: a base portion, a tape guiding pole, a sub-arm on which the tape guiding pole is fixed, a sub-arm supporting mechanism, and an adjusting screw mechanism, wherein the sub-arm supporting mechanism supports the sub-arm in a manner which makes an inclination angle of the tape guiding pole changeable, and the adjusting screw mechanism is capable of making a fine adjustment of an inclination angle of the tape guiding pole.

The objects described above are also achieved by the magnetic tape recording/reproducing apparatus, wherein the sub-arm supporting mechanism is comprised of: a shaft fixed to the base portion, and a spring member, the shaft supports the sub-arm in a manner which makes an inclination angle of the guiding pole changeable and the spring member pushes the sub-arm supported by the shaft in one direction in order to decrease vibration of the sub-arm, generated when a magnetic tape contacts the tape guiding pole.

The objects described above are also achieved by the magnetic tape recording/reproducing apparatus, wherein the adjusting screw mechanism is comprised of: a shaft member, a nut, and a spring member, one end of the shaft member is caulked with the base portion and a thread portion is formed on the other end of the shaft member, the shaft member penetrating a hole formed in the sub-arm and being tighten by the nut engaged with the thread portion of the shaft member, the spring member being located around the shaft member in a position between the base portion and the sub-arm and exerting a force in a direction to push up the sub-arm, and an inclination angle of the tape guiding pole is finely adjusted by tightening or loosening the nut located on the sub-arm.

According to the above magnetic tape recording/reproducing apparatus, since the apparatus includes the tape guiding pole angle adjusting mechanism, it is possible to adjust the inclination of a tape guiding pole even after an assembling process. Thus, damage to tape edges caused by an inaccurate contact with a tape guiding pole can be avoided and an improved tape running stability may be obtained. Therefore, a magnetic tape whose thickness is very thin, less than 10 μm for instance, can be used without problems according to the present invention.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings.

First, a description will be given of a first embodiment of a mechanism for adjusting an angle of a tape guiding pole and a recording-reproducing apparatus using the mechanism according to the present invention.

Figure 3:
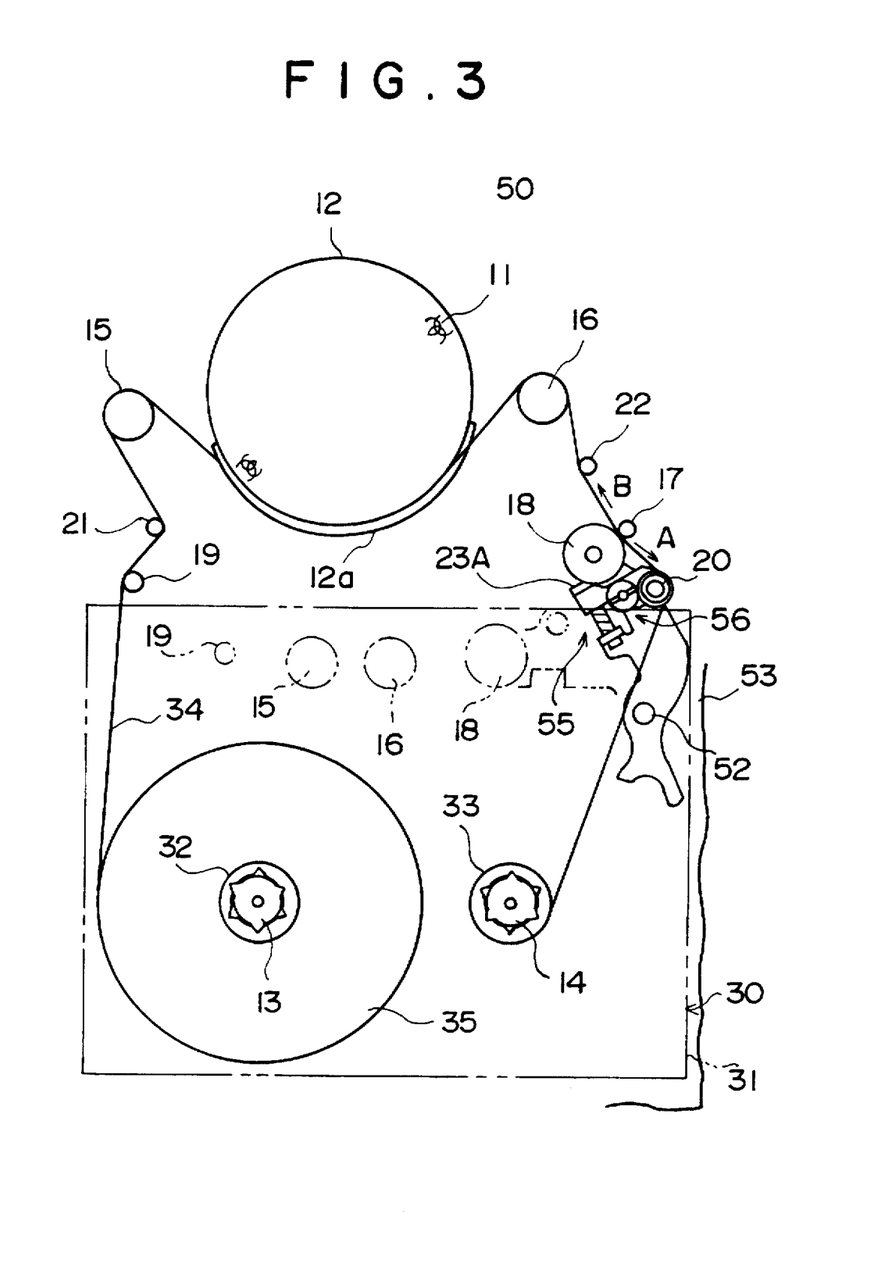
FIG. 3 is a structural diagram of a digital audio tape recorder according to a first embodiment of the present invention.

FIG. 3 is a structural diagram of a digital audio tape recorder 50 according to the first embodiment of the present invention. The DAT 50 has substantially the same structure as the DAT 10 shown in FIG. 1 except for the sub-arm portion. In FIG. 3, elements which are the same as the ones in FIG. 1 are indicated by the same reference numerals and an explanation thereof will be omitted.

Figure 4:
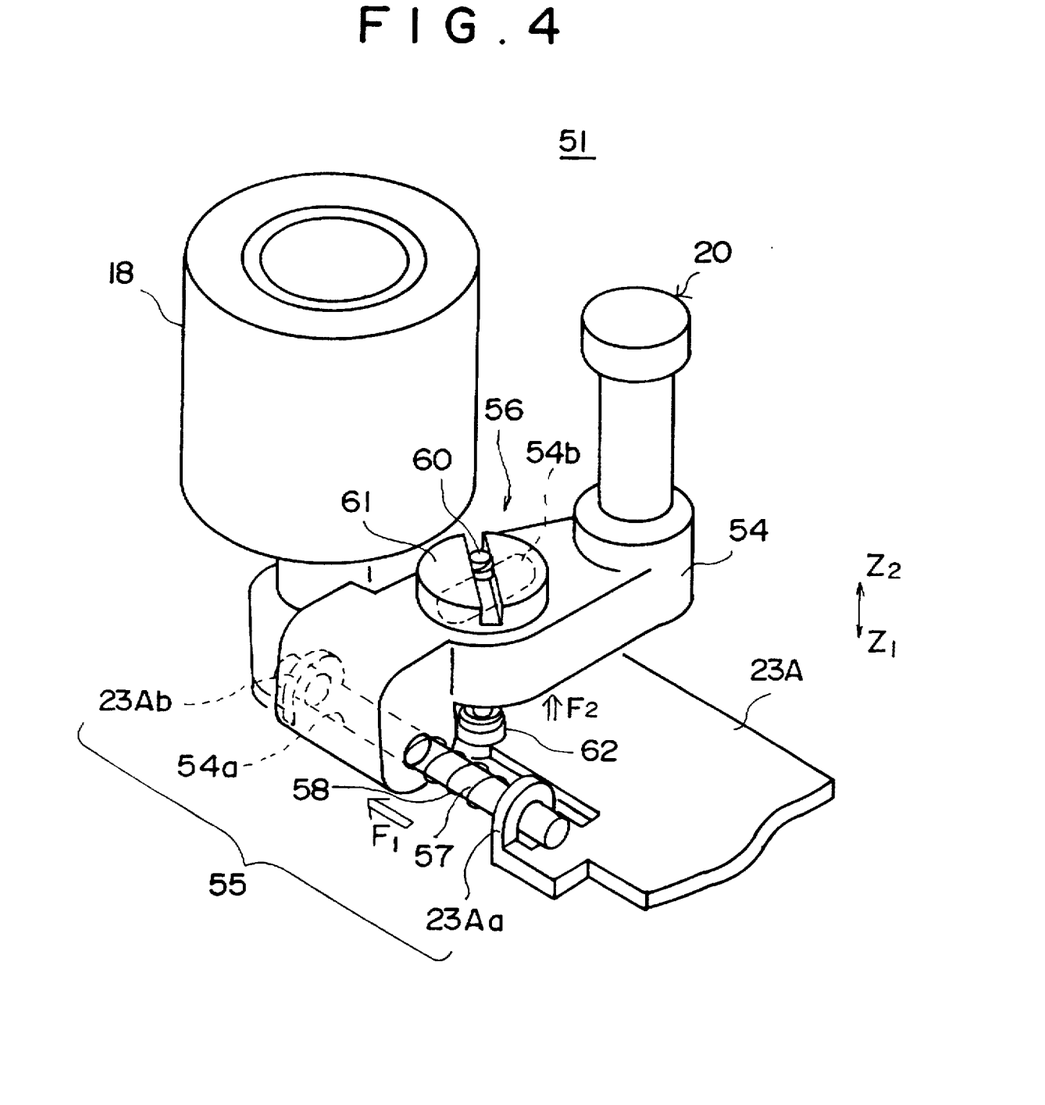
FIG. 4 is a diagram showing a perspective view of the tape guiding pole angle adjusting mechanism according to an embodiment of the present invention.
Figures 5A, 5B, 5C:
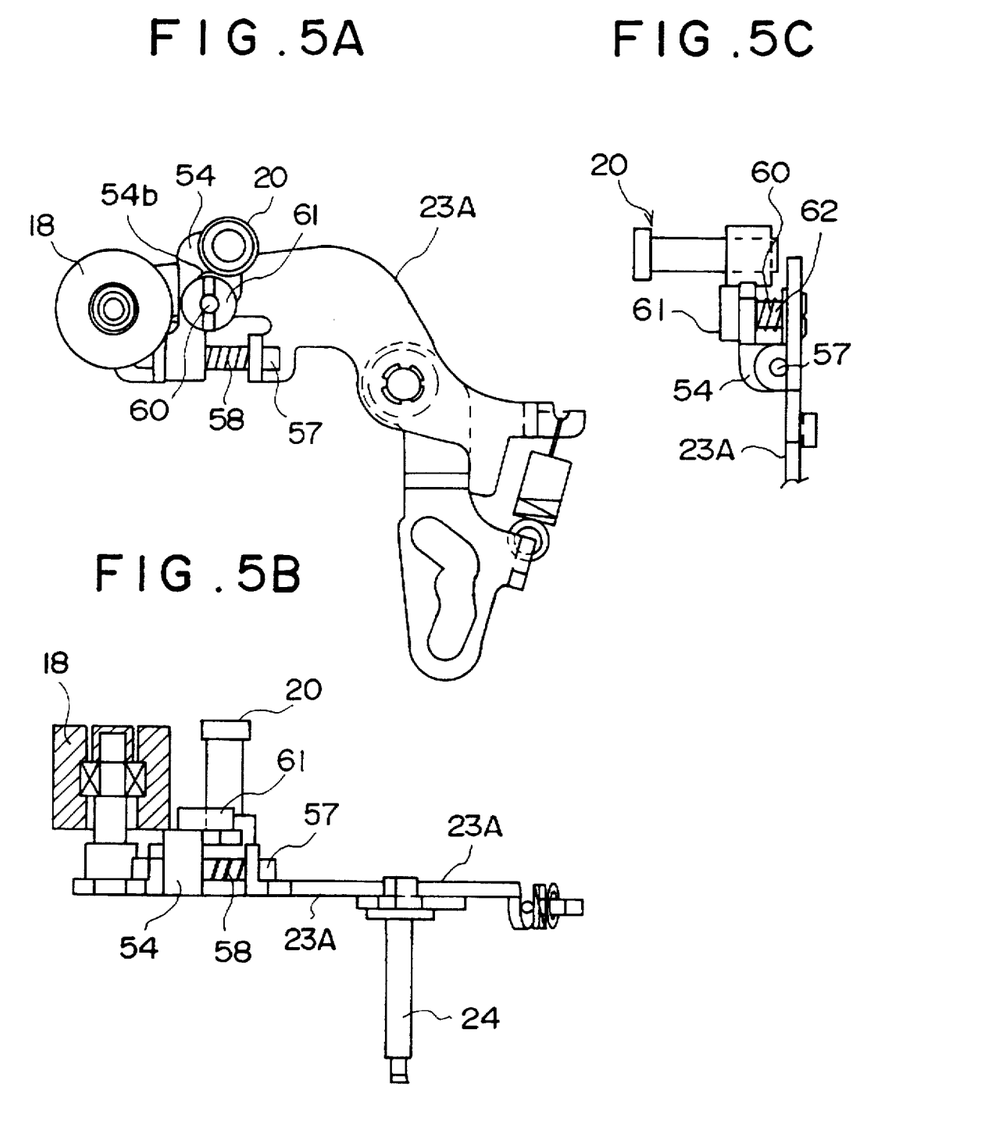
FIG. 5A is a diagram showing a top view of the tape guiding pole angle adjusting mechanism according to an embodiment of the present invention.
FIG. 5B is a diagram showing a front view of the tape guiding pole angle adjusting mechanism according to the embodiment of the present invention.
FIG. 5C is a diagram showing a side view of the tape guiding pole angle adjusting mechanism according to the embodiment of the present invention.

The DAT 50 includes a tape guiding pole angle adjusting mechanism 51 shown in FIGS. 4, 5A, 5B and 5C. FIG. 4 shows a perspective view of the tape guiding pole angle adjusting mechanism 51 and FIGS. 5A, 5B and 5C show a top, front and side views of the tape guiding pole angle adjusting mechanism 51, respectively.

As shown in the figures, the tape guiding angle adjusting mechanism 51 comprises a rotatable arm 23A, a sub-arm 54, a sub-arm supporting mechanism 55, and an adjusting screw mechanism 56. The rotatable arm 23A, which is a base portion, includes a shaft 24 rotatably supported by a chassis 53. The sub-arm 54 is made of a synthetic resin and an end portion of the tape guiding pole 20 is embedded therein. The sub-arm supporting mechanism 55 rotatably supports the sub-arm 54. The adjusting screw mechanism 56 displaces the sub-arm 54 slightly around the sub-arm supporting mechanism 55 as a center. The rotatable arm 23A rotates during a tape loading operation.

As shown in FIG. 4, the sub-arm supporting mechanism 55 is comprised of a shaft 57, a hole 54a formed in an end portion of the sub-arm 54, bearing portions 23Aa and 23Ab formed on the rotatable arm 23A, and a compression coil spring 58. Those parts are assembled as shown in FIG. 4. That is, both ends of the shaft 57 are supported by the bearings 23Aa and 23Ab, respectively, so that it may be fixed horizontally. The shafts 57 penetrates the hole 54a formed in the sub-arm 54 so that the sub-arm 54 is able to rotate around the shaft 57. By this rotation of the sub-arm 54 around the shaft 57, an inclination of the tape guiding pole 20 on the inlet side can be adjusted.

The compression coil spring 58 is provided around the portion of the shaft 57 between the sub-arm 54 and the bearing 23Aa in a compressed state. Thus, the compression coil spring 58 pushes the sub-arm 54 towards the bearing portion 23Aa located closer to the capstan 17 with a force F1. Therefore, the sub-arm 54 is pressed to the bearing 23Ab and there is no slack of the sub-arm 54. Therefore, the sub-arm 54 does not vibrate during running of the magnetic tape 34 although a force is generated in a running direction of the magnetic tape 34 due to friction of the tape guiding pole 20 and the magnetic tape 34. By this mechanism, since no vibration is generated by the sub-arm (or the tape guiding pole 20), the magnetic tape 34 can be moved smoothly and stably.

The adjusting screw mechanism 56 is comprised of a shaft member 60, a nut 61, and a compression coil spring 62. As shown in FIG. 4, one end of the shaft member 60 penetrates an opening 54b formed in the sub-arm 54 and fixed by the nut 61. The other end of the shaft member 60 is caulked with the rotatable arm 23A. The nut 61 is positioned on the sub-arm 54 and engaged with the upper portion of the shaft member 60 where threads are formed. The compression coil spring 62 is located around the shaft member 60 in a position between the rotatable arm 23A and the sub-arm 54 and exerts a force in a F2 direction shown in FIG. 4 to push up the sub-arm 54. The nut 61 is not hidden by, for instance, the pinch roller 18 and hence a tool such as a screw driver can easily reach the nut 61 to tighten or loose it.

Next, an angle adjusting operation for a tape guiding pole will be explained.

The angle adjusting operation for a tape guiding pole may be carried out when tape loading is performed and the magnetic tape 34 is running.

Figure 6A:
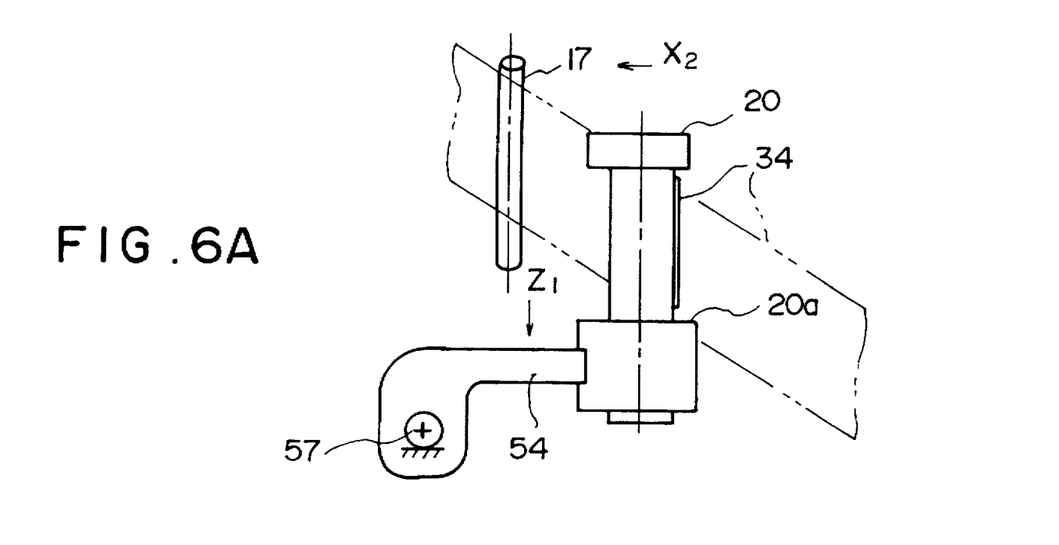
FIG. 6A shows a condition of the tape guiding pole according to an embodiment of the present invention before an angle adjusting operation is performed.

FIG. 6A shows a condition of the tape guiding pole 20 before an angle adjusting operation is performed. If the axis of the tape guiding pole 20 is inclined in the $X_2$ direction indicated by the arrow with respect to the axis of the capstan 17. In that case, the lower portion of the magnetic tape 32 more strongly contacts the tape guiding pole 20 than the upper portion of the magnetic tape 32 and, therefore, the position of the running magnetic tape 32 is shifted to the lower side. This tendency becomes especially noticeable during a reverse search mode.

Figure 6B:
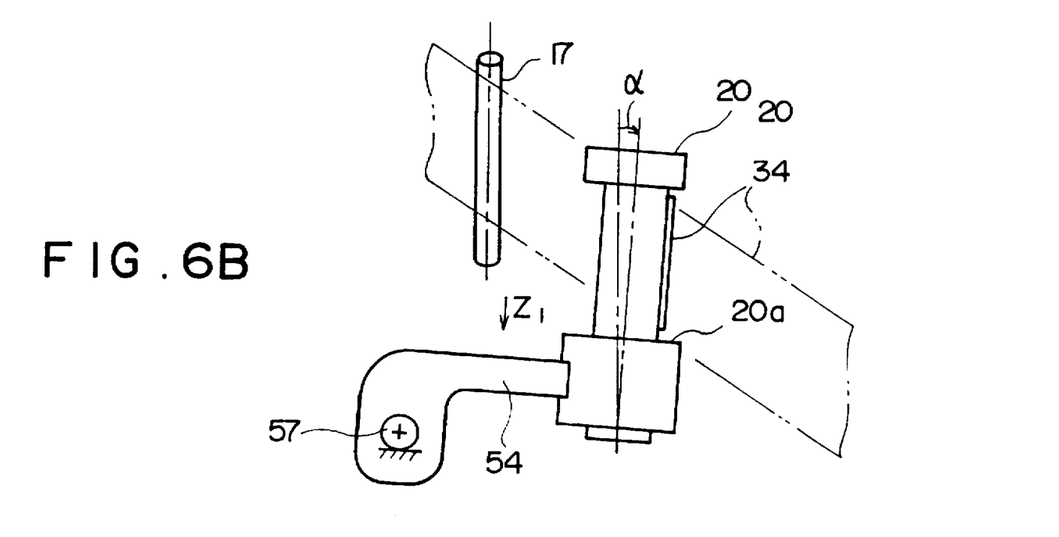
FIG. 6B shows a condition of the tape guiding pole according to the embodiment of the present invention after the angle adjusting operation is performed.

In the above mentioned case, according to the present invention, the nut 61 is rotated using a screw driver in a direction which tightens the engagement. By this operation, the nut 61 is displaced in the $Z_1$ direction indicated by an arrow and pushes the sub-arm 54. Thus, the sub-arm 54 compresses the compression coil spring 62 and slightly rotates in a clockwise direction with respect to the shaft 57. Therefore, the axis of the tape guiding pole 20 is moved with an angle α as indicated by the arrow in FIG. 6B until it becomes horizontal with the axis of the capstan 17. By this angle adjusting operation, the above-mentioned problem is eliminated and the lower portion of the magnetic tape 34 will not be damaged.

Figure 7A:
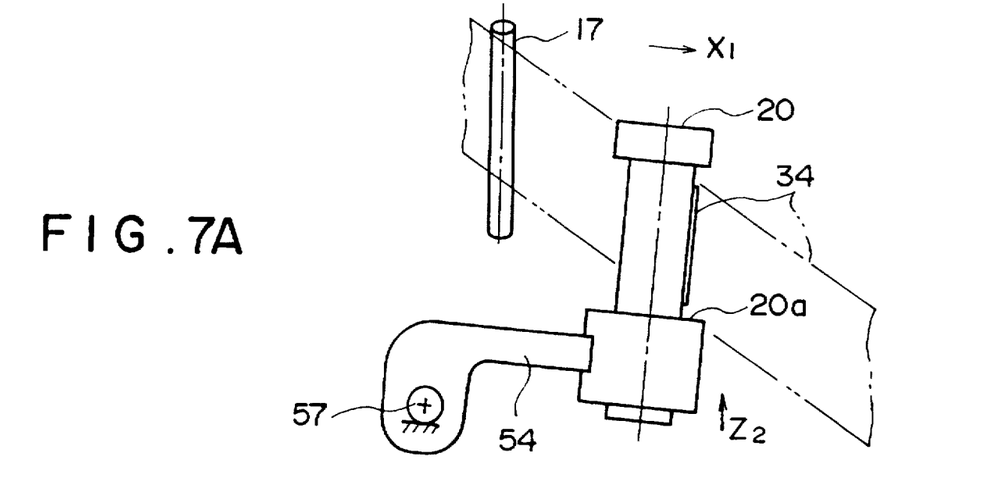
FIG. 7A shows a condition of the tape guiding pole according to an embodiment of the present invention before an angle adjusting operation is performed.

FIG. 7A shows another condition of the tape guiding pole 20 before an angle adjusting operation is performed. If the axis of the tape guiding pole 20 is inclined in the $X_1$ direction indicated by the arrow with respect to the axis of the capstan 17. In that case, the upper portion of the magnetic tape 32 more strongly contacts the tape guiding pole 20 than the lower portion of the magnetic tape 32 and, therefore, the position of the running magnetic tape 32 is shifted to the upper side. This tendency becomes especially noticeable during a reverse search mode.

Figure 7B:
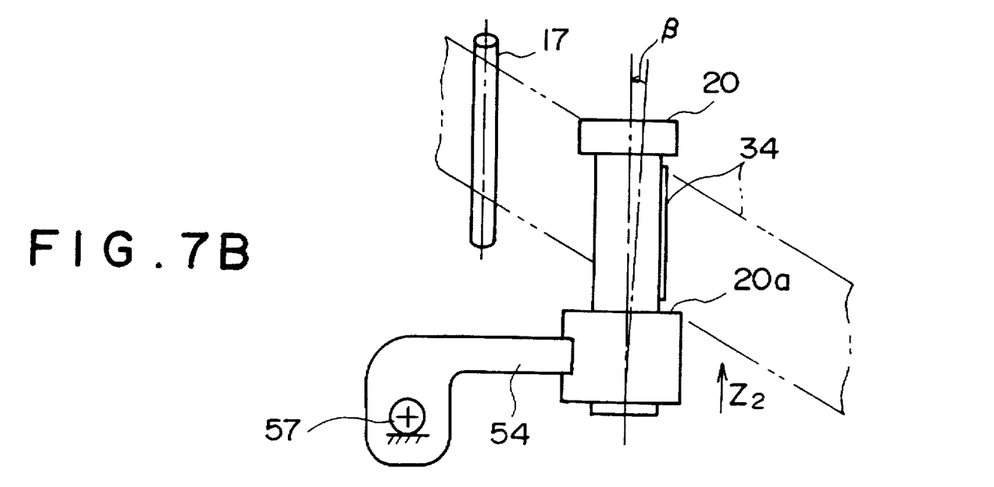
FIG. 7B shows a condition of the tape guiding pole according to the embodiment of the present invention after the angle adjusting operation is performed.

In the above mentioned case, according to the present invention, the nut 61 is rotated using a screw driver in a direction which loosen the engagement. By this operation, the nut 61 is displaced in the $Z_2$ direction indicated by an arrow. Thus, the sub-arm 54 is slightly rotates in an counterclockwise direction with respect to the shaft 57 due to a biasing force of the compression coil spring 62. Therefore, the axis of the tape guiding pole 20 is moved with an angle β as indicated by the arrow in FIG. 7B until its becomes horizontal with the axis of the capstan 17. By this angle adjusting operation, the above-mentioned problem is eliminated and the upper portion of the magnetic tape 34 will not be damaged.

As a result, according to the DAT 50 comprising the tape guiding pole 20 having an inclination is properly adjusted by the angle adjusting mechanism, it is possible to run a magnetic tape with a higher running stability compared with a conventional DAT and the magnetic tape will not be damaged if it is used a number of times.

Note that the angle of a tape guiding pole adjusted by the angle adjusting mechanism of the present invention is generally on the order of minutes of a degree. Thus, in practice, when the operation is carried out by the naked eyes, the position of the tape on the tape guiding pole 20 is first checked and after the running direction of the tape is reversed, its position on the guiding pole 20 is checked, then the screw is rotated in a direction which eliminates a difference in position of the tape.

As it will be obvious from the above description, it is possible to adjust the angle of the tape guiding pole 20 on the rotatable arm 23A. Thus, the angle of the tape guiding pole 20 may be adjusted during a running state of the magnetic tape 32 after the completion of the tape loading.

In addition, although the tape guiding pole angle adjusting mechanism according to the present invention is explained only for the tape guiding pole 20 on the inlet side, it is also possible to apply the same principle to the other tape guiding poles.

Also, it is obvious that the present invention is not limited to the above-mentioned embodiments, and variations and modifications may be made without departing from the scope of the present invention.

What is claimed is:

1. A tape guiding pole angle adjusting mechanism for a magnetic tape recording/reproducing apparatus, the tape guiding pole angle adjusting mechanism comprising a rotatable arm, a sub-arm adapted for adjustable connection to the rotatable arm, connecting means for adjustably connecting the sub-arm to the rotatable arm, a tape guiding pole fixedly attached to the sub-arm such that the tape guiding pole has an inclination angle with respect to the rotatable arm, and adjusting means for manually adjusting the inclination angle of the tape guiding pole with respect to the rotatable arm, whereby engagement of a magnetic tape with the tape guiding pole can be controlled, preventing damage to the tape.

2. The tape guiding pole angle adjusting mechanism of claim 1 wherein the rotatable arm comprises a pair of coaxially mounted bearing portions, the sub-arm comprises an end portion, the end portion having a hole, the means for adjustably connecting the sub-arm to the rotatable arm comprises a first shaft, the first shaft having a pair of ends, the first shaft being slidably received through the hole in the end portion of the sub-arm, the sub-arm being positioned along the first shaft intermediate the ends of the first shaft, and an end of the first shaft being received in each of the coaxially mounted bearing portions, such that the sub-arm is pivotably connected to the rotatable arm and rotatable about the longitudinal axis of the first shaft.

3. The tape guiding pole angle adjusting mechanism of claim 2 wherein the sub-arm has a body portion, the body portion being adjacent the end portion, the body portion having a hole, and wherein said means for adjusting the inclination angle of the tape guiding pole with respect to the rotatable arm comprises a second shaft, the second shaft having a lower end, the lower end being fixedly connected to the rotatable arm, the second shaft also having a threaded upper end, the threaded upper end extending through the hole in the body portion of the sub-arm; a nut, the nut being adapted for engagement with the threads on the upper end of the second shaft member which extends through the hole in the body portion of the sub-arm; and a second spring member, the second spring member being slidably mounted onto the second shaft intermediate the rotatable arm and the sub-arm, the second spring member being in a state of compression when mounted and exerting a force tending to urge the sub-arm away from the rotatable arm such that through a tightening or loosening of the nut on the upper end of the second shaft, acting against the force exerted on the sub-arm by the second spring member, a rotation of the sub-arm about the longitudinal axis of the first shaft is effected and a desired inclination angle of the sub-arm, and the tape guiding pole fixedly attached thereto, is achieved and maintained.

4. The tape guiding pole angle adjusting mechanism of claim 2 further comprising a first spring member, the first spring member being slidably mounted onto the first shaft, the first spring member being positioned intermediate the sub-arm and a first one of the bearing portions, the first spring member being in a state of compression when mounted, such that the first spring member exerts a force tending to urge the sub-arm in a direction contrary to a direction of tape running during a readout operation such that the sub-arm abuts a second one of the bearing portions, thereby decreasing vibration of the sub-arm caused by contact between the tape guiding pole fixedly attached thereto, and a magnetic tape.

5. A magnetic tape recording/reproducing apparatus comprising an opening, the opening being adapted to receive a tape cassette, a feed reel shaft, a take-up reel shaft, a magnetic head, and a tape guiding pole angle adjusting mechanism, the tape guiding pole angle adjusting mechanism being located adjacent the entrance, the tape guiding pole angle adjusting mechanism including a rotatable arm, a sub-arm adapted for adjustable connection to the rotatable arm, connecting means for adjustably connecting the sub-arm to the rotatable arm, a tape guiding pole fixedly attached to the sub-arm such that the tape guiding pole has an inclination angle with respect to the rotatable arm, and adjusting means for manually adjusting the inclination angle of the tape guiding pole with respect to the rotatable arm, whereby engagement of a magnetic tape with the tape guiding pole can be controlled, preventing damage to the tape.

6. The magnetic tape recording/reproducing apparatus of claim 5 wherein the rotatable arm comprises a pair of coaxially mounted bearing portions, the sub-arm comprises an end portion, the end portion having a hole, the means for adjustably connecting the sub-arm to the rotatable arm comprises a first shaft, the first shaft having a pair of ends, the first shaft being slidably received through the hole in the end portion of the sub-arm, the sub-arm being positioned along the first shaft intermediate the ends of the first shaft, and an end of the first shaft being received in each of the coaxially mounted bearing portions, such that the sub-arm is pivotably connected to the rotatable arm and rotatable about the longitudinal axis of the first shaft.

7. The magnetic tape recording/reproducing apparatus of claim 6 wherein the sub-arm has a body portion, the body portion being adjacent the end portion, the body portion of the sub-arm having a hole, and wherein said means for adjusting the inclination angle of the tape guiding pole with respect to the rotatable arm comprises a second shaft, the second shaft having a lower end, the lower end being fixedly connected to the rotatable arm, the second shaft also having a threaded upper end the threaded upper end extending through the hole in the body portion of the sub-arm; a nut, the nut being adapted for engagement with the threads on the upper end of the second shaft member which extends through the hole in the body portion of the sub-arm; and, a second spring member, the second spring member being slidably mounted onto the second shaft intermediate the rotatable arm and the sub-arm, the second spring member being in a state of compression when mounted and exerting a force tending to urge the sub-arm away from the rotatable arm such that through a tightening or loosening of the nut on the upper end of the second shaft, acting against the force exerted on the sub-arm by the second spring member, a rotation of the sub-arm about the longitudinal axis of the first shaft is effected and a desired inclination angle of the sub-arm, and the tape guiding pole fixedly attached thereto, is achieved and maintained.

8. The magnetic tape recording/reproducing apparatus of claim 6 further comprising a first spring member, the first spring member being slidably mounted onto the first shaft, the first spring member being positioned intermediate the sub-arm and a first one of the bearing portions, the first spring member being in a state of compression when mounted, such that the first spring member exerts a force tending to urge the sub-arm in a direction contrary to the direction of tape running during a readout operation such that the sub-arm abuts a second one of the bearing portions, thereby decreasing vibration of the sub-arm caused by contact between the tape guiding pole fixedly attached thereto, and a magnetic tape.

* * * * *